United States Patent
Huitema et al.

(10) Patent No.: US 7,564,436 B2
(45) Date of Patent: Jul. 21, 2009

(54) LUMINESCENCE AND COLOR VARIATION COMPENSATION IN A FLEXIBLE DISPLAY

(75) Inventors: Hjalmar Edzer Ayco Huitema, Eindhoven (NL); Peter Albert Cirkel, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 501 days.

(21) Appl. No.: 10/528,251

(22) PCT Filed: Aug. 8, 2003

(86) PCT No.: PCT/IB03/03627

§ 371 (c)(1),
(2), (4) Date: Mar. 17, 2005

(87) PCT Pub. No.: WO2004/027746

PCT Pub. Date: Apr. 1, 2004

(65) Prior Publication Data

US 2006/0109391 A1  May 25, 2006

(30) Foreign Application Priority Data

Sep. 20, 2002 (EP) .................................. 02078905

(51) Int. Cl.
*G09G 3/36* (2006.01)
(52) U.S. Cl. ............................ 345/87; 345/76; 345/82; 345/89
(58) Field of Classification Search ............ 345/76–100
See application file for complete search history.

(56) References Cited

U.S. PATENT DOCUMENTS

| 6,204,634 | B1 * | 3/2001 | Zimmerman et al. | 320/128 |
| 6,677,709 | B1 * | 1/2004 | Ma et al. | 313/504 |
| 6,717,847 | B2 * | 4/2004 | Chen | 365/185.03 |
| 6,896,723 | B2 * | 5/2005 | Irvin et al. | 106/31.43 |

* cited by examiner

*Primary Examiner*—Richard Hjerpe
*Assistant Examiner*—Kimnhung Nguyen
(74) *Attorney, Agent, or Firm*—Leydig, Voit & Mayer Ltd.

(57) ABSTRACT

A gray level compensation mechanism is proposed for flexible displays. Flexible displays exhibit cell gap variations upon bending. The cell gap is measured during operation of the display (capacitive, piezoelectric). The pixel voltage is adjusted according to the measured cell gap. This results in a gray level that is independent of the local bending radius.

32 Claims, 6 Drawing Sheets

LUMINESCENCE AND COLOR VARIATION COMPENSATION IN A FLEXIBLE DISPLAY

Figure 1:
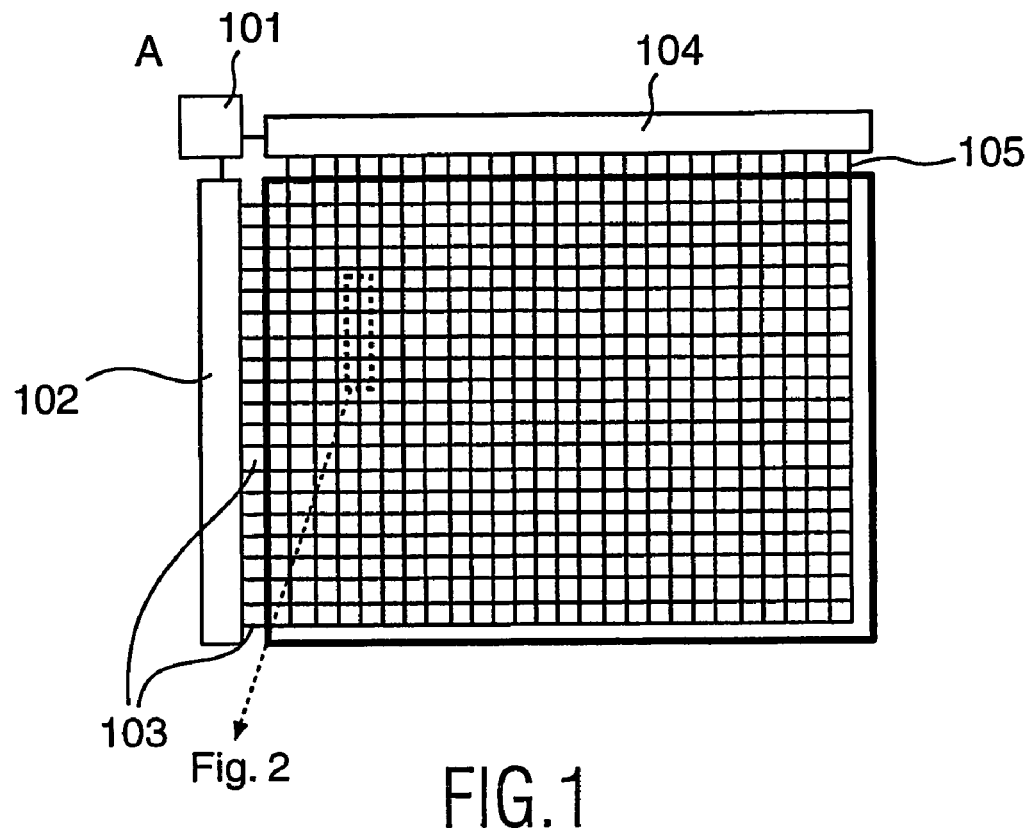

The present invention relates to an apparatus for compensating for variations in luminescence and/or color in a voltage-driven, flexible display, said variations being associated with a bending of said flexible display, said apparatus comprising measurement means for measuring the cell gap at at least a part of the flexible display, and adjustment means for adjusting the voltages, which are applied to said part of said flexible display, depending on the measured cell gap.

The present invention also relates to a flexible display comprising such an apparatus and to a portable apparatus comprising such a flexible display.

The present invention also relates to a method for compensating for variations in luminescence and/or color in a voltage-driven, flexible display, said variations being associated with a bending of said flexible display, wherein the method comprises the steps of: measuring the cell gap at least a part of the flexible display, and adjusting the voltages, which are applied to said part of the flexible display, in relation to the measured cell gap.

Liquid Crystal Displays (LCDs) are devices which control an electric field which is applied to a liquid crystal material having a dielectric anisotropy to transmit or shut off light, thereby displaying text or an image, all in a fashion known per se as is recognized by those skilled in the art and as will be briefly explained. Unlike display devices that generate light internally—such as electroluminiscence (EL) devices, cathode ray tubes (CRT) and light emitting diodes (LED)—LCDs use an external light source.

LCD devices are largely classified into transmissive type devices and reflective type devices, depending on the method of utilizing light. Apart from a liquid crystal panel having a liquid crystal mixture injected between two transparent substrates, the transmissive type LCD further includes a backlight unit for supplying light to the liquid crystal panel. It is however very difficult to make a transmissive LCD with thin thickness and low weight. Moreover, the backlight units of transmissive LCDs have excessive power consumption.

Reflective type LCDs, on the other hand, include a reflective liquid crystal display panel that transmits and reflects natural light and peripheral light to and from the display screen without a backlight unit.

A basic liquid crystal display can easily be constructed by coating two separate thin sheets of a transparent material, such as glass or plastics, with a transparent metal oxide. Preferably the metal oxide is applied in the shape of parallel lines on each of the separate sheets, and constitute the row and column conductors of the LCD. When the two sheets are superimposed with the row conductors perpendicular to the column conductors, the rows and columns form a matrix of pixel elements. The row conductors further serve to set up the voltage across a cell, which is necessary for the orientation translation.

An alignment layer, sometimes referred to as an orientation layer, is applied to each sheet. The alignment layer may have undergone a rubbing process resulting in a series of microscopic grooves which are parallel and will assist in aligning the contained liquid crystal molecules in a preferred direction, with their longitudinal axes parallel to the grooves, which "anchors" the molecules along the alignment layers and helps force the molecules between the alignment layers to twist.

One of the thin sheets is coated with a layer of polymer spacer beads. These beads maintain a uniform gap between the sheets of glass where the liquid crystals are eventually placed. The two glass sheets are then placed together and the edges are sealed with epoxy. A corner is left unsealed so that the liquid crystal material can be injected under a vacuum. Once the display has been filled with liquid crystals, the corner is sealed and polarizers (the transparent layers with lines) are applied to the exposed glass surfaces.

The display is completed by connecting the row and column conductors to the driving circuitry which controls the voltage applied to various areas of the display.

Flexible displays based on electro-luminescence have been shown in wearable devices, and flexible displays based on liquid crystals are currently in a research phase.

Flexible liquid crystal display (LCD) technologies promise ultra-low power consumption, and can even provide features such as zero-power image retention. In addition to satisfying the requirements of existing low end applications, this display technology could open up new markets for electronic displays, such as rewritable shelf-edge displays for supermarkets or electronic message stickers.

Flexible displays can accordingly be used in electronic paper, wearable electronics, consumer electronics, displays for portable devices such as mobile telephones, portable computers, electronic calendars, electronic books, televisions or video game controls and various other office automation equipment and audio/video machinery etc, and in all other products in which flexible displays can be used.

There are however many applications for flexible displays, wherein the flexible display is not used in a conventional, flat position. Such applications may for instance comprise electronic paper and wearable flexible displays.

When a user observes a flexible display, which for instance may be arranged on clothing or arranged over objects of various or even varying shapes, some parts of the observed, flexible display may be perceived as flat, whereas other parts may be perceived as bent. It has been observed that certain, undesirable changes in the luminescence levels and/or colors of a flexible display tend to occur when a flexible display is subject to bending.

Due to the non-rigid structure of a flexible display, bending of said flexible display causes variations in the cell gap of said flexible display, so that the cell gap at a first part of the flexible display is different from the cell gap at a second part of the flexible display.

During normal operation, the orientation and arrangement of a flexible display may repeatedly be subject to change, whereby variations in bending and hence variations in cell gap occur more or less randomly over time, throughout the flexible display and in a manner, which is not possible to predict.

These local cell gap variations, wherein the cell gap at a first part of the display is different from the cell gap at a second part of the display, imply changes of the luminescence levels or the colors which are displayed by a flexible display—typically by its pixels, which results in the undesired non-uniformity in the brightness of a displayed image or text. Any user will perceive these and other bending-related performance characteristics as limitations on the potentials of flexible displays in various aspects.

Brightness furthermore being one of the most important features in displays of any kind implies that it is easy to conceive that a flexible display, which in addition to its flexible properties would demonstrate less or no variation in the luminescence levels and/or colors during normal operation, i.e. when the display is bent in various ways as the situation requires, would constitute a significant breakthrough in the field of flexible display technologies.

U.S. Pat. No. 5,699,139, "Liquid crystal device having pressure relief structure" to Aastuen and Wenz, hereby incorporated by reference, discloses a liquid crystal display (LCD) having an active area for display of information and an inactive area adjacent the active area. The inactive area includes a pressure relief region for relieving pressure generated within the cell, thereby minimizing the effects of pressure variation in the active area. The display is comprised of two substrates, at least one of which is flexible, which are joined at their peripheries. A plurality of spacer members placed between the substrates ensures a uniform gap between the substrates in an active area. The spacer members are preferably attached to both of the substrates in the active area, but to at most one of the substrates in the inactive area. The pressure relief region serves to relieve pressure within the display (usually caused by temperature changes) by flexure of the flexible substrate, thereby eliminating distortions within the active area. The flexure of the flexible substrate is enhanced by thinning the substrate in the pressure relief region or by the incorporation of an edge spacer member which serves to prevent attachment of the spacer members to both of the substrates in the pressure relief region.

The above mentioned invention relates to relieving pressure, which is caused by changes in temperature, in prior art liquid crystal devices, and is therefore associated with many shortcomings concerning the problem of reducing the perceived changes in luminescence levels and/or colors in flexible displays, in which said changes are caused by the bending of such a display and the subsequent, associated cell gap variations.

Changes in luminescence and/or color, which are caused by cell gap variations due to the bending of a flexible display, can not be compensated for simply by providing a pressure relief region which would provide a constant pressure in the liquid crystal device.

When we consider the fundamental, non-rigid structure of flexible liquid crystal displays, it is conceivable that whereas certain first dimensions of a flexible liquid crystal display cell, e.g. the thickness, may be reduced when the flexible display is subject to stress during bending of the display, secondary flexible liquid crystal display cell dimensions, e.g. the length, may be stretched and hence expand during bending of the display. Such a simultaneous metamorphosis would result in a constant flexible liquid crystal display cell volume (and hence a constant flexible liquid crystal display cell pressure) during bending of the display.

It is furthermore conceivable, that a concave bending of a flexible display would result in the same pressure as a corresponding convex bending, and that there are many other similar effects associated with the concept of symmetry, which a simple pressure relief structure fails to take into account.

Furthermore, the described introduction of an inactive pressure relief region would require physical space and thus constitute an important limitation to the resolution of a display, and furthermore result in an overall reduction of brightness and performance in general. Such a region would also render a flexible display bulky, heavier and more difficult to manufacture.

Providing constant pressure in the cells of a liquid crystal display according to the invention described above does thus not constitute an adequate method of mitigating the problems with a perceived fluctuation in luminescence levels or colors in a flexible display depending on its orientation or arrangement.

The international patent application PCT/US00/05756, "Compensation for edge effects and cell gap variation in tiled flat-panel, liquid crystal displays" to Greene and Krusius, hereby incorporated by reference, discloses procedures for correcting discoloration and brightness variations dues to liquid crystal gap variations or other optical, electro-optical, ambient light, electronic, mechanical, and materials anomalies arising in tilted, flat-panel displays. The purpose of these corrections is to achieve a visually seamless appearance. Absolute, relative and/or smoothing corrections are implemented by performing pixel data video processing by temporarily storing incoming video data in an input frame buffer memory, reading the video data from the input frame buffer memory and correction data from the correction data memory under the control of the pixel correction control unit into the pixel data processor. Further, the pixel correction control unit may be merged with the pixel data processing unit. Also corrected pixel data may be collected in an output frame buffer memory before it is sent to the display.

The arrangement discussed in the aforementioned, international patent application relates to a specific kind of cell gap variation, which is well behaved and smooth within a tile, but discontinuous from tile to tile, and therefore associated with innumerable shortcomings to the cell gap problems associated with bending effects in flexible displays, wherein brightness and chromacity variations due to bending may occur over the entire display in a manner which is not necessarily smooth over a display part and which may be impossible to predict.

The aforementioned arrangement proposes the matching of absolute luminance and chromacity values with the corresponding nominal values, an approach which assumes constant brightness and chromacity distortions and does not take into account the fact that flexible displays may be subject to different kinds of bending and hence different luminance and chromacity values over time.

The aforementioned arrangement does furthermore not take into account the fact that changes in temperature or pressure to which the flexible liquid crystal display may be subject during normal operation may also change the luminescence and color levels.

The arrangement furthermore proposes experimental determination of the correction data by measurements of transmission as a function of applied voltage for a pixel at a tile seem, and subsequent comparison with the nominal expected value. This would not be possible to implement for a flexible display, since the fluctuations in luminance and chromacity would necessitate new such transmission measurements to be performed every time the orientation or arrangement (bending) of the liquid crystal flexible display would be altered. Such an approach would imply permanent transmission measurement means being integrated with a flexible display, said transmission measurement means having a derogatory impact on the performance of the flexible display in terms of increased weight, reduced flexibility, increased cost and complexity etc.

The arrangement furthermore proposes the implementation of a look-up table comprising data for individual pixels, which is a bulky, memory means necessitating solution requiring both time and processing capacity.

It is an object of the invention to overcome or at least mitigate the described disadvantages, problems and limitations of the prior art, which is achieved with an apparatus according to claim 1, a flexible display according to claim 11, a portable apparatus according to claim 14, and a method according to claim 16. Additional, preferred features of the invention are claimed in additional, dependent claims.

According to a first aspect, the present invention relates to an apparatus for compensating for variations in luminescence and/or color in a voltage-driven, flexible display, said variations being associated with a bending of said flexible display, said apparatus comprising: measurement means for measuring the cell gap at at least a part of the flexible display, and adjustment means for adjusting the voltages, which are applied to said part of said flexible display, depending on the measured cell gap, wherein the measurement means are set to repeatedly measure the cell gap, and the adjustment means are set to repeatedly adjust the applied voltages in response to the measured cell gap.

According to another aspect, the invention relates to a flexible display comprising such an apparatus and to a portable apparatus comprising such a flexible display.

According to yet another aspect, the present invention also relates to a method for compensating for variations in luminescence and/or color in a voltage-driven, flexible display, said variations being associated with a bending of said flexible display, wherein the method comprises the steps of measuring the cell gap at at least a part of the flexible display, and adjusting the voltages, which are applied to said part of the flexible display, in relation to the measured cell gap, wherein the steps are performed repeatedly during operation of the flexible display.

The measures as defined in claims 2-5 and 17-20 have inter alia the advantages that the performance of the compensating means may be adjusted to power consumption and other parameters in order to provide stable, predictable performance characteristics of the luminescence and/or color in response to bending of the display.

The measures as defined in claims 6-10 have inter alia the advantages that the number of points where measurement of the cell gap should be performed can be minimized as a function of the bending characteristics of a flexible display, thereby optimizing the number of measurement means and consequently minimizing power consumption, weight and cost.

The measures as defined in claims 11-13 have inter alia the advantages that they partially represent presently preferred embodiments of the invention.

Generally speaking, the present invention relates to a new and innovative compensation apparatus for flexible displays. The invention is based on the discovery that fluctuations in luminescence and color occur when flexible displays of liquid crystal type are bent in different ways. The origin of these fluctuations is the non rigid nature of the materials, which are used for manufacturing flexible displays, and which give rise to changes in the cell gap in various parts of a flexible display during bending. A change in the cell gap will influence the switching characteristics of the flexible display, causing it to reflect more or less light than what was intended. Experiments which have been carried out by the inventors have furthermore revealed how the observed variations depend on the bending. It is an objective of said compensation apparatus to remove or at least reduce the impact which the bending of the flexible display has on the perceived luminescence and/or color.

The obvious solution to this problem would be to select other materials which would be more resistant to stress and bending so that the cell gap would be as constant as possible. Instead, the present inventors propose to repeatedly measure the cell gaps at certain parts of the display and hence repeatedly deduce the current nature of the bending of the display, and adapt the voltages, which are applied to different parts of the display, in response to the measured cell gap.

During use of a flexible display comprising a compensation apparatus according to the invention, the measurement means repeatedly measures the local cell gap at specific locations of the display, and after having measured the cell gap, the voltages which are applied to the display are adjusted so that an observer does not perceive any or only minimal changes in the luminescence levels and/or color when the display is bent.

These and other aspects of the invention will be apparent from and elucidated with reference to the embodiments described hereinafter.

Figure 2:
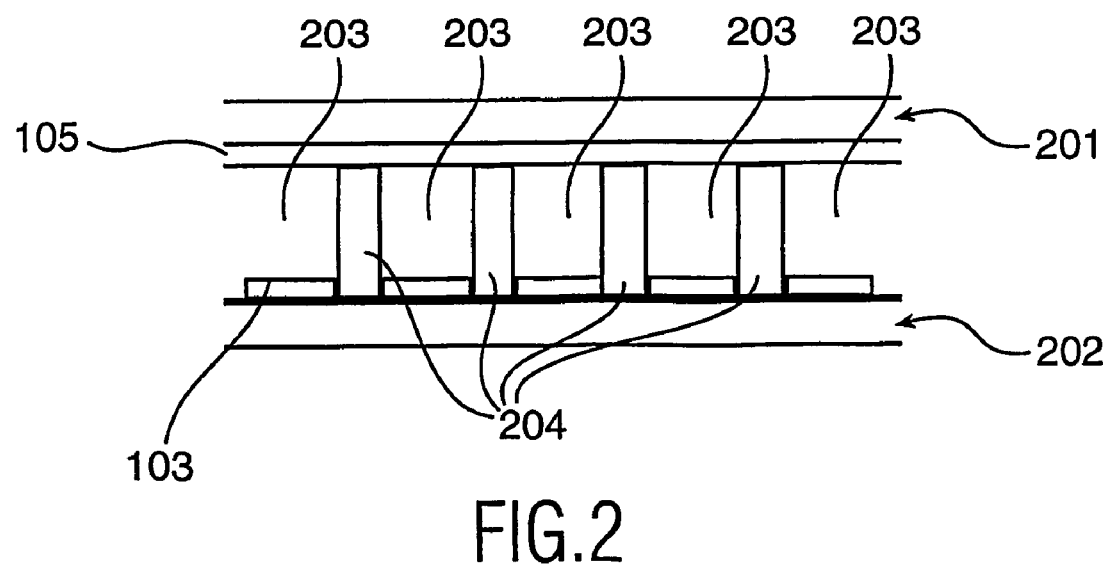
Figure 3:
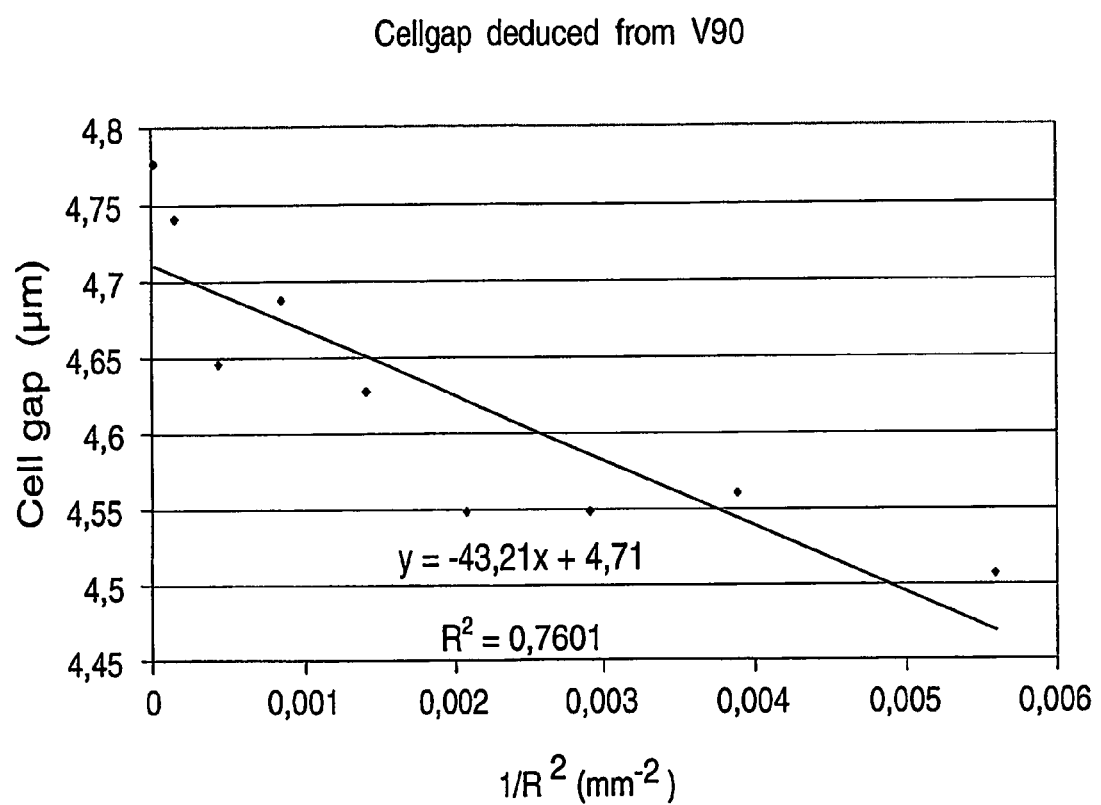
Figure 4:
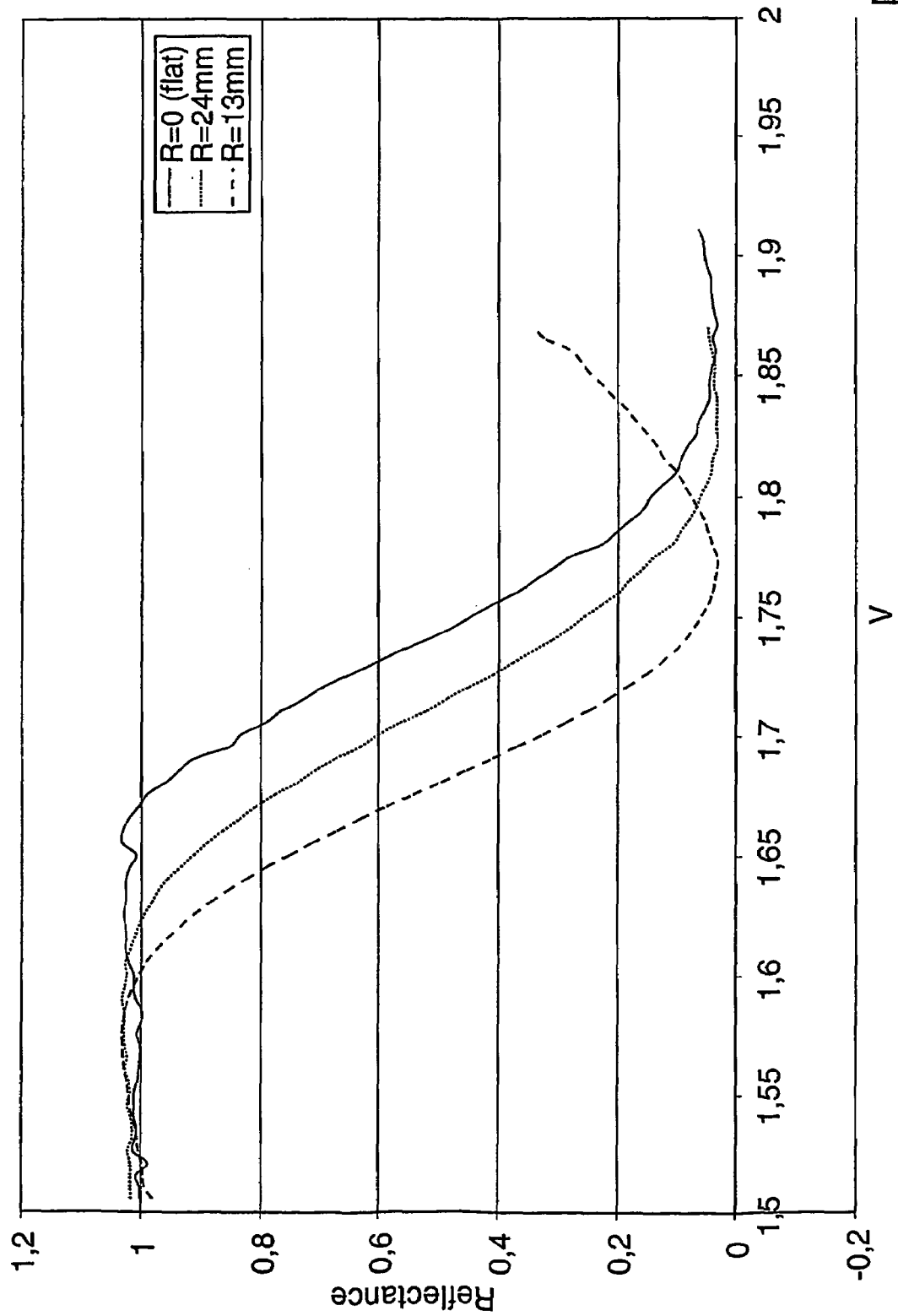
Figure 5:
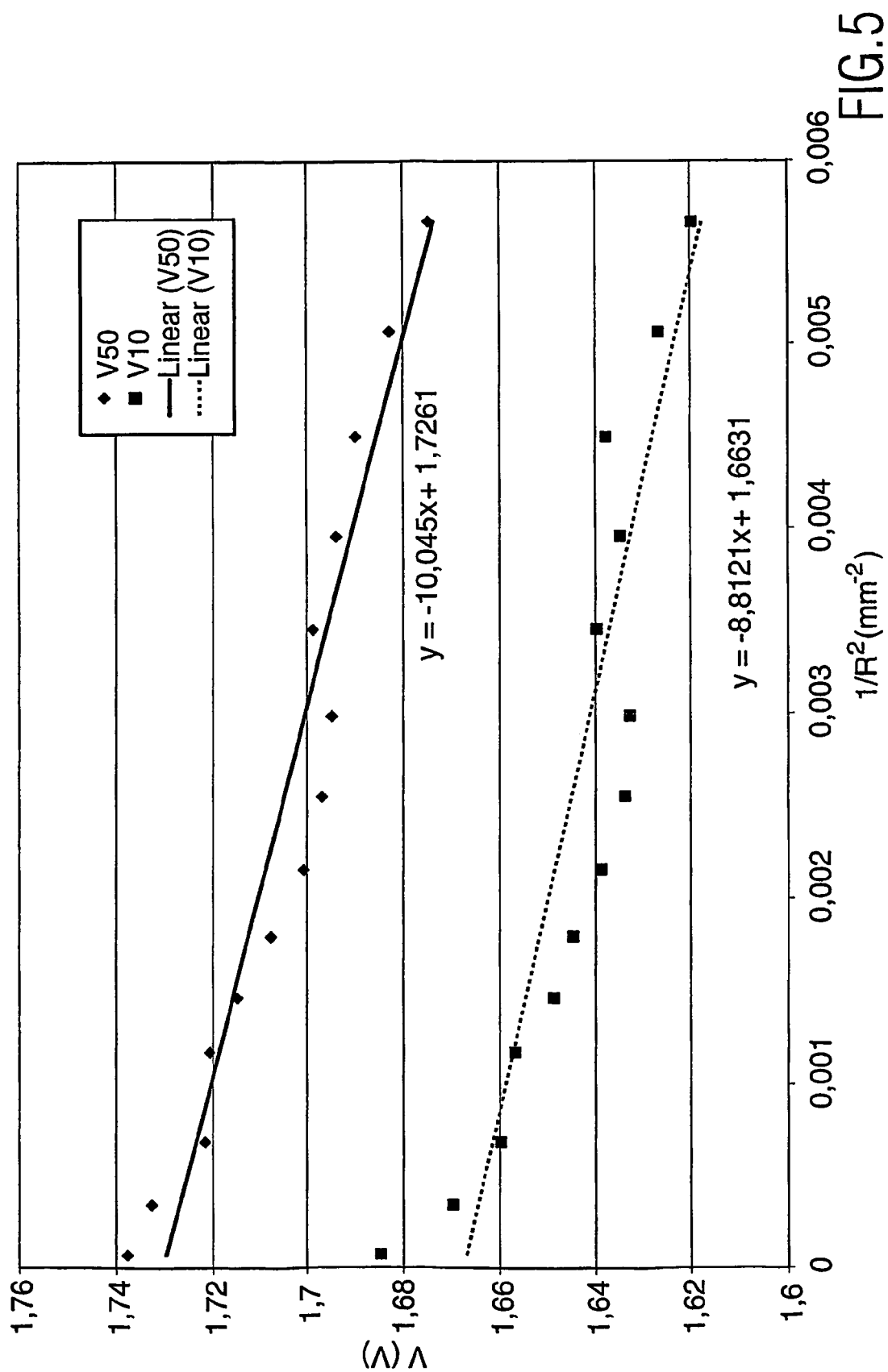

A complete understanding of the present invention may be obtained by reference to the accompanying drawings when considered in conjunction with the subsequent, detailed description, wherein:

FIG. 1 is a schematic drawing of a passive-matrix liquid crystal display,

FIG. 2 is a schematic side view of a part of a flexible display which is based on liquid crystals, FIG. 3 is a diagram of the cell gap as a function of the bending radius in a flexible display, FIG. 4 is a graph of reflection as a function of the applied voltage in a reflective STN display during bending, FIG. 5 is a graph which depicts the applied voltage, at which the reflectivity has decreased 50% compared to its maximum (V50), and the applied voltage, at which the reflectivity has decreased 10% compared to its maximum (V10) as a function of 1 over the bending radius squared.

Figure 6:
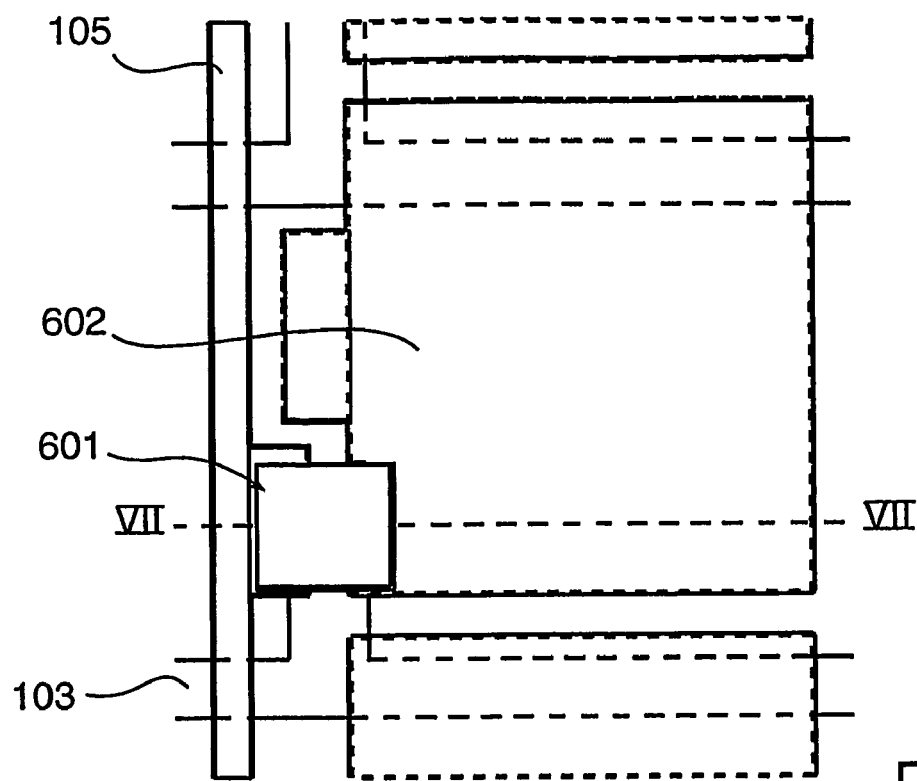
Figure 7:
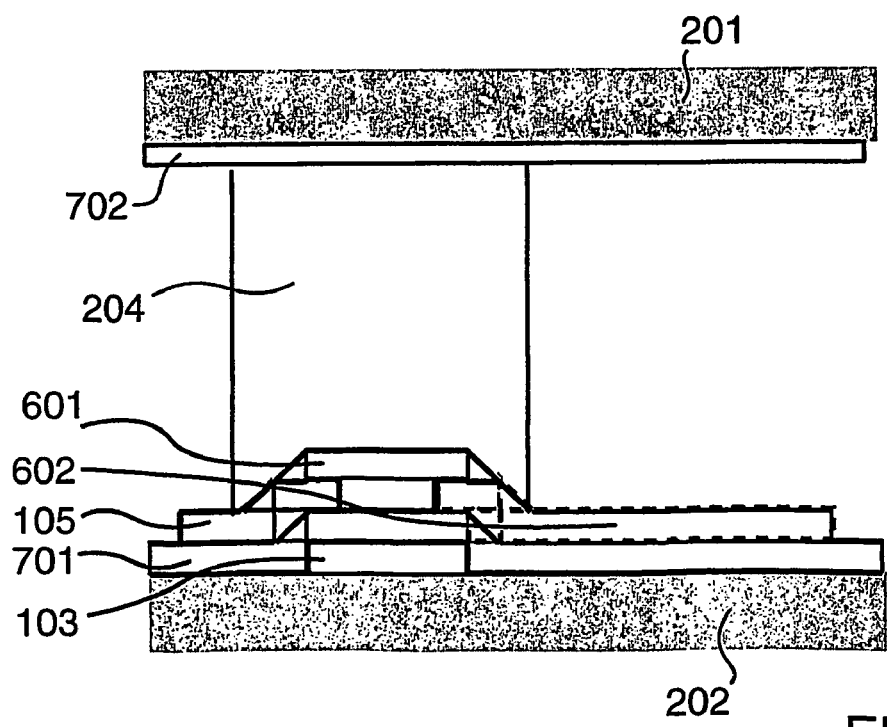
Figure 8:
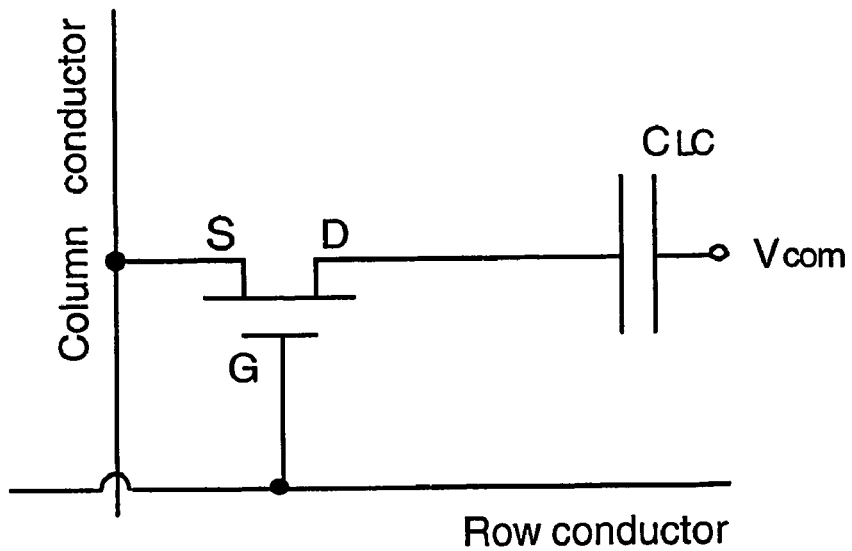
Figure 9:
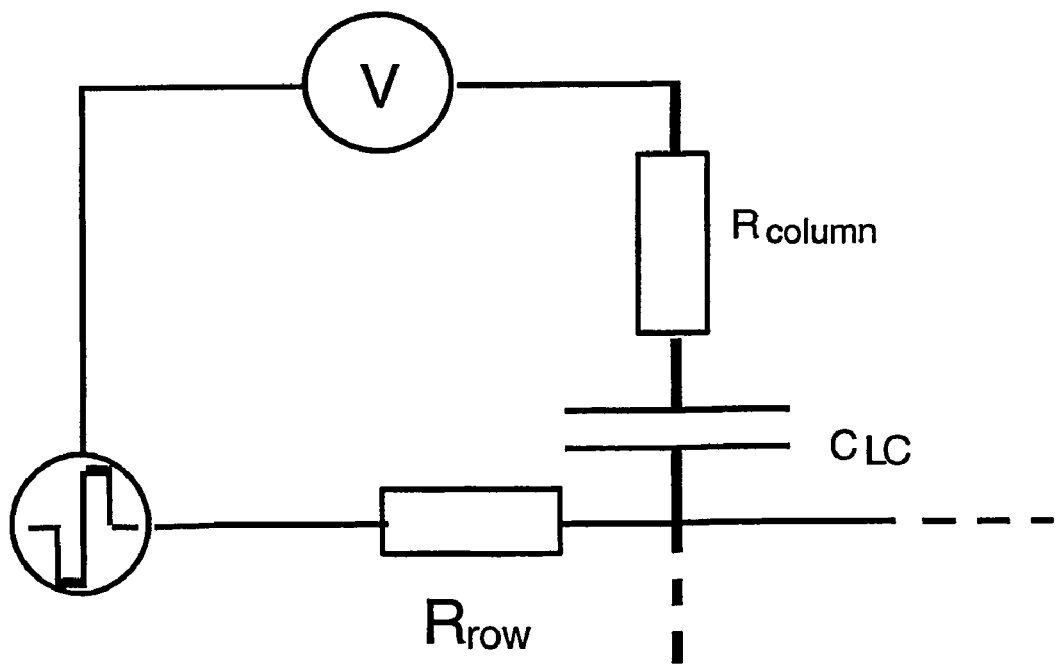

FIG. 6 is a schematic drawing of a possible layout of a pixel in an active-matrix display, FIG. 7 is an enlarged sectional view taken along line VII-VII in FIG. 6, FIG. 8 is a circuit diagram of the equivalent circuit of a pixel in an active-matrix display, and FIG. 9 is a circuit diagram of the equivalent circuit of a passive-matrix cell gap measurement setup according to the invention.

The present invention accordingly relates to an apparatus and a method for correcting variations in luminescence (comprising, but not limited to, brightness and intensity of reflected or transmitted light) as well as variations in color (comprising, but not limited to, discoloration, changes in chromacity, changes in color and changes in gray level) in a flexible display, said variations mainly being associated with a bending of said flexible display. These variations may however also relate to other liquid crystal display cell gap variations or to other optical, electro-optical, ambient light, electronic, mechanical, and materials anomalies which may arise in flexible displays.

FIG. 1 is a schematic drawing of a flexible, passive-matrix liquid crystal display. A data processor 101 controls a row driver 102, which drives a series of parallel row conductors 103, and a column driver 104, which drives a corresponding series of parallel column conductors 105. Every crossing of a row and a column line defines a pixel. The data processor 101, the row driver 102 and the column driver 104 are normally semiconductor-based.

To address a particular display element (e.g. a pixel) in the array, a positive voltage is applied by the row driver at the appropriate row conductor and a negative voltage is similarly applied to the appropriate column conductor (or vice versa) so that a composite RMS-voltage which exceeds an activation threshold voltage, whereby the liquid crystal material in an element is activated, is applied across the selected element. To ensure that non-selected elements are not inadvertently addressed, neither the positive nor the negative voltage described above should alone exceed an activation threshold voltage. This process of applying voltages, known as multiplexing, can be repeated until all of the elements in the display have been addressed. As the number of elements addressed by a common row or column line is increased, the voltage difference between "on" and "off" pixels typically decreases, thereby reducing contrast.

In many prior art arrangements, the row conductors and the column conductors are arranged on separate substrates, on opposite sides of the liquid crystal material. In a flexible display, all connections should be arranged on one side of the display. The column conductors should therefore be routed to the same side as the row conductors or vice versa FIG. 2 is a schematic side view of a part of a flexible display which is based on liquid crystals. The flexible display comprises a top plastic substrate 201 and a bottom plastic substrate 202, each of which having a thickness of 50-100 µm. A liquid crystal layer 203 having a thickness of 4-10 µm is arranged between the top and bottom substrates 201, 202. Lithographic spacers 204 are arranged to obtain a uniform cell gap throughout the flexible liquid crystal display. Said lithographic spacers may be made by spin coating a resist layer such as SU8 which is patterned by photolithography into pillars, bars, etc, in a way known per se as is recognized by those skilled in the art.

FIG. 3 is a diagram of the cell gap as a function of the bending radius in a flexible CTLC-display (cholesteric texture liquid crystal display). Data was collected using the same flexible display, which was bent about different radiuses of curvature. An analysis of these measurements revealed, that it was possible to predict the cell gap from data on the bending radius using the equation $$d = d_0 - \Delta d = a - b/r^2 \quad (1)$$

wherein d denotes the cell gap (µm), $d_0$ denotes the cell gap when the display is not bent (µm) and $\Delta$d denotes the change in cell gap upon bending of the display (µm), a and b denote constants and r denotes the bending radius (mm).

Using the equation (1) and assigning the constants the values a=7.7 (µm) and b=43.2 ((mm)²(µm)), the relative change of the cell gap upon bending may therefore be expressed as:

$$\frac{\Delta d}{d_0} = \frac{c}{r} \quad (2)$$

wherein c denotes a constant, c=9.2 (mm)². A relative change of 1% is then obtained at a bending radius of r=30 mm.

Since an electric field, which is applied over a liquid crystalline layer is inversely proportional to the cell gap, a decrease of the cell gap by 1% will result in a corresponding 1% increase of the electrical field. The liquid crystalline material changes the gray level of the pixel in response to the increased electric field. For the CTLC-display of FIG. 3, the maximum voltage is 25 V. In order to produce 16 gray levels, the voltage must be controlled to within 0.1 V per gray level. This is 0.4% of the maximum addressing voltage. A change in cell gap of 1% therefore corresponds to 2.5 gray levels which is unacceptable.

For passive-matrix STN (super twisted nematic) displays the same problem occurs because of the steep transmission-voltage curve combined with the large threshold voltage that results in very small (relative) voltage intervals per gray level. For active-matrix displays the problem will be worse because the process must be carried out on substrates with a high degree of dimensional stability, which tend to have a higher elasticity modulus, which is needed to obtain a good alignment of the layers during processing of the active-matrix. This results in much larger cell gap variations when bending the display. For a flexible E-ink display, the problem will also be larger due to the thick E-ink layer that is needed (100-200 micron). The neutral bending line is then far away from the substrates. When bending the display, the relative cell gap variation will therefore be much larger.

FIG. 4 is a graph of reflection as a function of the applied voltage in a reflective STN display during bending, and illustrates a problem for which the proposed invention seeks to provide a remedy.

During an experiment, the results of which are illustrated in FIG. 4, the switching characteristics, i.e. reflection as a function of applied voltage, were determined for the same plastic STN-display while it was arranged in a flat position (bending radius R=0) and while it was bent around two different radiuses (R=13 mm and R=26 mm). It can easily be seen that the reflection which is obtained for a certain voltage is completely different for different bending radiuses. Therefore it is impossible to make grayscales by varying the root-mean-square voltage. It doesn't matter whether this voltage is changed by changing the amplitude or the pulse width of the addressing pulse (the latter method is preferred in STN displays). It is important to note that the STN display under consideration is much thicker than a CTLC display because polar/retardation films were arranged on the outside of a 200 micron thick substrate, (the total thickness of the display (substrates+films) being 2×200+2×120=640 micron).

FIG. 5 is a graph which depicts the applied voltage, at which the reflectivity has decreased 50% compared to its maximum (V50), and the applied voltage, at which the reflectivity has decreased 10% compared to its maximum (V10), as a function of 1 over the bending radius squared. This graph furthermore elucidates a problem which the proposed invention proposes to solve or at least mitigate. The illustrated dependence is approximately linear for both parameters, with the same slope, and hence compensation for the bending related cell gap changes can be done by decreasing the switching voltage (or pulse width) by a certain percentage dictated by the value of one divided with the bending radius squared.

The previously discussed problems are solved or at least mitigated by the provision of an apparatus and a method by which the cell gap of the pixels, or a physical property which is associated with the cell gap of the pixels, in a flexible, voltage-driven display are measured; and the voltages, which are applied to the pixels, are adjusted in response to the measured cell gaps in order to compensate for the change in cell gap. With such an apparatus or method, the gray level of a pixel in a gray scale flexible display becomes independent of the local bending radius.

The cell gap can be measured in several ways. One method is disclosed in U.S. Pat. No. 5,777,596, which is hereby incorporated by reference. The display elements of a liquid crystal display behave like capacitors. As is well known in the art, the charge time of a capacitive circuit is related to the capacitance of the circuit. Therefore, measuring the relative charge time (or discharge time) of the display elements is an indirect method of measuring the relative capacitance of the elements. The measure of the relative capacitance can be used to deduce the cell gap.

Liquid crystal displays are presently of the previously illustrated, passive-matrix type or of the active-matrix type. An active-matrix display includes a separate electronically controlled switch at each LCD element. This switch may for instance be a MOS thin film transistor (TFT) deposited adjacent to the corresponding element on the glass substrate. The switches may be turned on and off by applying a voltage to or removing a voltage from a control terminal. If a MOS device is being used, for example, the control terminal is the gate terminal of the MOS device.

FIG. 6 is a schematic drawing of a part of a possible layout of a measurement setup in a pixel in an active-matrix display. A pixel is defined at every crossing between a row conductor 103 and a column conductor 105. The pixel is connected to the row conductor 103 and the column conductor 105 by a transistor 601. A lithographic spacer 204 and a pixel pad 602 are also illustrated.

FIG. 7 is an enlarged sectional view taken along line VII-VII in FIG. 6. The row conductors 103 and the column conductors 105 are deposited on the same substrate, separated by an insulator layer 701. On the top substrate 201, an unpatterned counter conductor 702 (an electrode) is present, which together with the pixel pad 303 forms a pixel capacitor, illustrated in the circuit diagram of FIG. 8 as $C_{LC}$.

FIG. 8 is a circuit diagram of the equivalent circuit of a pixel in an active-matrix display.

In a typical active-matrix display, all of the switch control terminals, which are associated with a particular row of the array, are connected to a common row bus. When a voltage is applied to this row bus, each of the elements in that particular row are connected to a corresponding column bus. Voltages may then be delivered to each of the elements in the selected row, via the corresponding column busses, to set the desired display state of each of the elements. The display voltages may be delivered to the display elements one column at a time or, more preferably, all at the same time. A separate display control unit (not shown) synchronizes the delivery of display voltages to the display elements to create the desired images.

The display control unit may include, for example, a microprocessor or sequencer for controlling the operation and timing of the elements, a display memory for storing display data for the entire array, and a line buffer for storing and transferring voltage select signals for the selected row of the display.

Because the voltage level applied to the corresponding column bus of a display element in an active-matrix display is not limited like it is for a passive display, a wide range of voltages may be applied to the column bus and variable intensities may be achieved. In an active-matrix device the time required for charging a pixel is a measure of its capacitance, when a constant voltage is used on the column conductor.

One of the measurement rows is first selected (i.e. the transistors in that row are made conducting). All pixels in that row are in a reference state before the selection (for example black or white). Next, a voltage is applied on all column conductors and the time, which is required for the current through the column conductors to drop below a certain level is recorded. This provides a measurement of the pixel capacitance of all pixels in the row. When this capacitance is then compared to the pixel capacitance in a reference state, the current cell gap can be extracted.

The display is driven line-by-line. During one frame time, all the rows are sequentially selected by applying a voltage that changes the thin film transistors (TFTs) from the non-conducting to the conducting state. In this line selection time, the pixel capacitors of the selected row are charged to the voltage supplied on the column conductors. During the remaining frame time (i.e. the hold time) the other rows are addressed. The TFTs are then in their non-conducting state and the charge on the pixel capacitors must be retained. In order to suppress visible flicker due to small asymmetries in charging between even and odd frames and to be able to show video content, the frame rate of an LCD must be at least 50 Hz. Measurement of the pixel capacitance can then be done on the row and column conductors, at the row and column drivers.

For a passive-matrix another method can be used. The pixels in the measurement rows must be in a reference state (e.g. black or white for example). An AC-signal is then supplied on the row conductor. It is best to use a frequency that is higher than the highest frequencies used during addressing of the display. This signal is detected on the columns. The amplitude of the signal on the column conductors compared to that supplied on the row conductors is then a measure of the pixel capacitance, and can be used to deduce the cell gap.

FIG. 9 is a circuit diagram of the equivalent circuit of a passive-matrix cell gap measurement setup according to the invention.

The display is driven line-by-line. During one frame time all the rows are sequentially selected by applying a voltage that switches the pixels to mid-grey. Column voltages are then applied that set the correct grey level for every pixel in the selected row. The column voltage is too low to affect the switching state of pixels in rows that are not selected. During the remaining frame time the other rows are selected.

Measurement of the pixel capacitance can then be done on the row and column conductors, at the same position as the row driver and column driver.

It is very likely that flexibility in one direction only will be used in many applications. The reason for this is that fully flexible displays are difficult to produce, as bending can lead to saddle point deformations in the display, which would induce high levels of stress on its substrates. An example of a flexible display with flexibility in one direction only is electronic (news) paper, wherein the display can be carried in a tube and rolled out of the tube by pulling at a stiff vertical support.

An embodiment of the invention in a flexible display with flexibility in one direction only is conceivable. A flexible display comprising a number of elongated bar-shaped arrangements of pixels is provided with measurement row means. The measurement rows have one pixel for every column of the display, which makes it possible to compensate for a change in the cell gap for every column individually. In order to increase the accuracy of the measurement, it is also possible to average over a number of columns in the display. The compensation for a change in the cell gap is a scaled column voltage. If the cell gap decreases with 1%, the column voltage must increase with 1%. For super twisted nematic (STN) and twisted nematic (TN) displays this relation is somewhat more difficult due to the change in twist angle upon a change in the cell gap. In that case a lookup table must in addition be used in order to find the correct scaling factor for the column voltage.

For displays with flexibility in all directions, the cell gap must be known over the complete display area. In that case measurement of the cell gap in test pixels is not possible, as these cannot be used to display information at the same time. A possible solution is to incorporate a cell gap measurement means in the lithographic spacers. This can be done by using a piezo-electric element in the spacers. A piezo-electric element translates pressure into a voltage difference between its contacts. As the pressure on the spacers is the cause of the change in the cell gap, the voltage difference across the piezo electric element can be used as input for gray level compensation.

When one piezo electric element is incorporated per pixel, the compensation can be done for every pixel individually or averaging over groups of pixels is possible in order to increase the accuracy of the cell gap measurement. Another possibility is to incorporate a piezo electric element at a few points in the display only, resulting in gray level compensation for groups of pixels in the display.

A conceivable embodiment would comprise the incorporation of one or a plurality of conducting spacer parts instead of or close to some of the lithographic spacers, and the provision of one or a plurality of measurement conductors (electrodes), for instance on the top or bottom substrates. It is also conceivable that a row or column conductor could be used as such a measurement conductor. The conducting spacer parts would preferably comprise a piezo-electric element. A change in cell gap would cause a change in the capacitance between the measurement conductor and the conducting spacer parts, and determination of the AC-impedance at a certain number of points by means of voltage or current sensors would constitute a measurement of the cell gap.

It is also conceivable that the cell gaps may be measured at certain positions in the display, whereupon this data in combination with knowledge of the structure of the display and its bending characteristics may be combined to compensate for the local bending at various parts of the entire display. This may for instance be performed using spline interpolation, since the flexible display as such can be treated as a continuous, curved plane.

Once the cell gap has been measured, adjustment means control the row and column drivers to adjust the voltages, which are applied to a part of the display in response to the measured cell gap. Such adjustment means may be implemented in various ways as has been described and as is evident to a person skilled in the art.

The frequency of repetition of measurement and the frequency of repetition of measurement could be constant, for instance 50 Hz, or varied as a function of user settings, operation conditions or both.

It could furthermore be established that the adjustment means of the apparatus according to the invention should not be activated unless the measured cell gap change is above a determined threshold value.

The constituent features of the invention thus comprise measurement means for repeatedly measuring the cell gap at at least a part of the flexible display, and adjustment means for repeatedly adjusting the voltages, which are applied to said part of said flexible display, depending on the measured cell gap.

In the embodiments described above it was only proposed to compensate for grayscale errors by changing the amplitude of the column voltage. In general, grayscales in LCD displays can also be produced by defining a number of sub fields during addressing of a row. The sub fields have a different length in time (e.g. often the time ratio is chosen as: 1, 2, 4, 8, . . . ) and during each sub field the column voltage can be on or off. The total on/off ratio of the pixel then generates the required gray level for the viewer. Here also a gray level compensation is possible by changing the total on/off ratio for the pixels (e.g. choosing different sub fields in which the column voltage is on or off). When the display can only be bent over one constant radius in the row direction, it is also possible to compensate by scaling the length of the sub fields.

A generalization of the already proposed gray scale compensation by changing the amplitude of the column voltage is possible for passive-matrix displays. When the display can only be bent over one constant radius in the row direction, also the row voltage can be used for gray scale compensation.

The apparatus according to the present invention may, for example, be realized as a separate, stand-alone unit, or may alternatively be included in, or combined with, a mobile terminal for a telecommunications network, such as GSM, UMTS, GPS, GPRS or D-AMPS, or another portable device of existing type, such as a Personal Digital Assistants (PDA), palmtop computer, portable computer, electronic calendar, electronic book, television set or video game control, as well as various other office automation equipment and audio/video machinery, etc.

The invention has mainly been described above with reference to several embodiments. However, other embodiments than the ones disclosed above are equally possible within the scope of the invention, as defined by the appended patent claims. All terms used in the claims are to be interpreted according to their ordinary meaning in the technical field, unless explicitly defined otherwise herein. All references to "a/an/the [element, means, component, member, unit, step etc.]" are to be interpreted openly as referring to at least one instance of said element, means, component, member, unit, step etc. The steps of the methods described herein do not have to be performed in the exact order disclosed, unless explicitly specified.

The invention claimed is:

1. A flexible, voltage driven, display comprising an apparatus for compensating for variations in luminescence and/or color in the flexible display, said variations being associated with a bending of said flexible display, said apparatus for compensating comprising:
   measurement means for measuring a cell gap at a part of the flexible display, and
   adjustment means for adjusting voltages, which are applied to said part of said flexible display, depending on the measured cell gap,
   characterized in that the measurement means are set to repeatedly measure the cell gap, and the adjustment means are set to repeatedly adjust the applied voltages in response to the measured cell gap, and
   wherein the flexible display is an active-matrix display comprising a plurality of pixels and a plurality of conductors, and wherein the measurement means are set to measure the cell gap at a part of the display by measuring the time which is required for charging a pixel when a constant voltage is supplied on an associated conductor.

2. The flexible display according to claim 1, wherein a frequency of repetition of measurement and a frequency of repetition of adjustment are constant.

3. The flexible display according to claim 1, wherein at least one of a frequency of repetition of measurement and a frequency of repetition of adjustment are controlled as a function of user settings, operation conditions or both.

4. The flexible display according to claim 1, wherein the adjustment means are effected only when a change in cell gap is detected.

5. The flexible display according to claim 4, wherein the adjustment means are effected only when a change in cell gap above a certain threshold is detected.

6. The flexible display according to claim 1, wherein the flexible display is flexible in one direction only, and wherein the measurement means are distributed along the axis of flexibility.

7. The flexible display according claim 1, wherein the flexible display is flexible in two directions, and wherein the measurement means are distributed throughout the flexible display.

8. The flexible display according to claim 1, wherein at least one measurement means is arranged within at least one lithographic spacer.

9. The flexible display according to claim 1, wherein the number and arrangement of the measurement means have been optimized given the flexibility of the display.

10. A portable apparatus comprising a flexible display according to claim 1

11. A portable apparatus according to claim 10, wherein the portable apparatus is one of an electronic paper, a personal digital assistant (PDA), a mobile telephone, a set of wearable electronics, a portable computer, an electronic calendar, an electronic book, a television or a video game control.

12. A method for compensating for variations in luminescence and/or color in a voltage-driven, flexible active matrix display comprising a plurality of pixels and a plurality of conductors, said variations being associated with a bending of said flexible display, wherein the method comprises the steps of:
   measuring a cell gap at a part of the flexible display, and
   adjusting voltages, which are applied to said part of the flexible display, in response to the measured cell gap,
   characterized in that the steps are performed repeatedly during operation of the flexible display and measuring the cell gap at a part of the display by measuring the time which is required for charning a pixel when a constant voltage is supplied on an associated conductor.

13. A method according to claim 12, wherein the frequency of repetition of measurement and adjustment is constant.

14. A method according to claim 12, wherein at least one of a frequency of repetition of measurement and a frequency of repetition of adjustment are controlled as a function of user settings, operation conditions or both.

15. A method according to claim 12, wherein said step of adjusting is performed only when a change in cell gap is detected.

16. A method according to claim 15, wherein said step of adjusting is performed only when a change in cell gap above a certain threshold is detected.

17. A flexible, voltage driven, display comprising an apparatus for compensating for variations in luminescence and/or color in the flexible display, said variations being associated with a bending of said flexible display, said apparatus for compensating comprising:
   measurement means for measuring a cell gap at a part of the flexible display, and
   adjustment means for adjusting voltages, which are applied to said part of said flexible display, depending on the measured cell gap,
   characterized in that the measurement means are set to repeatedly measure the cell gap, and the adjustment means are set to repeatedly adjust the applied voltages in response to the measured cell gap, and wherein the flexible display is a passive-matrix display, and wherein the measurement means are set to deduce the cell gap by supplying an AC-signal to a row conductor, measuring the amplitude of the signal on the column conductors and comparing it with the amplitude of the signal which is supplied on an associated conductor.

18. The flexible display according to claim 17, wherein a frequency of repetition of measurement and a frequency of repetition of adjustment are constant.

19. The flexible display according to claim 17, wherein at least one of a frequency of repetition of measurement and a frequency of repetition of adjustment are controlled as a function of user settings, operation conditions or both.

20. The flexible display according to claim 17, wherein the adjustment means are effected only when a change in cell gap is detected.

21. The flexible display according to claim 20, wherein the adjustment means are effected only when a change in cell gap above a certain threshold is detected.

22. The flexible display according to claim 17, wherein the flexible display is flexible in one direction only, and wherein the measurement means are distributed along the axis of flexibility.

23. The flexible display according claim 17, wherein the flexible display is flexible in two directions, and wherein the measurement means are distributed throughout the flexible display.

24. The flexible display according to claim 17, wherein at least one measurement means is arranged within at least one lithographic spacer.

25. The flexible display according to claim 17, wherein the number and arrangement of the measurement means have been optimized given the flexibility of the display.

26. A portable apparatus comprising a flexible display according to claim 17.

27. A portable apparatus according to claim 26, wherein the portable apparatus is one of an electronic paper, a personal digital assistant (PDA), a mobile telephone, a set of wearable electronics, a portable computer, an electronic calendar, an electronic book, a television or a video game control.

28. A method for compensating for variations in luminescence and/or color in a voltage-driven, flexible passive-matrix display comprising a plurality of pixels and a plurality of conductors, said variations being associated with a bending of said flexible display, wherein the method comprises the steps of:
   measuring a cell gap at a part of the flexible display, and
   adjusting voltages, which are applied to said part of the flexible display, in response to the measured cell gap,
   characterized in that the steps are performed repeatedly during operation of the flexible display wherein the cell gap is deduced by supplying an AC-signal to a row conductor, measuring the amplitude of the signal on the column conductors and comparing it with the amplitude of the signal which is supplied on an associated conductor.

29. A method according to claim 28, wherein the frequency of repetition of measurement and adjustment is constant.

30. A method according to claim 29, wherein said step of adjusting is performed only when a change in cell gap is detected.

31. A method according to claim 30, wherein said step of adjusting is performed only when a change in cell gap above a certain threshold is detected.

32. A method according to claim 29, wherein at least one of a frequency of repetition of measurement and a frequency of repetition of adjustment are controlled as a function of user settings, operation conditions or both.

* * * * *